O. C. PHELPS.
Feed Wheel for Sewing Machines.
No. 43,705.
Patented Aug. 2, 1864.
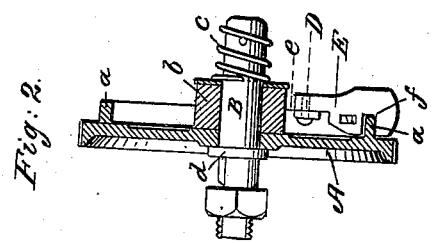
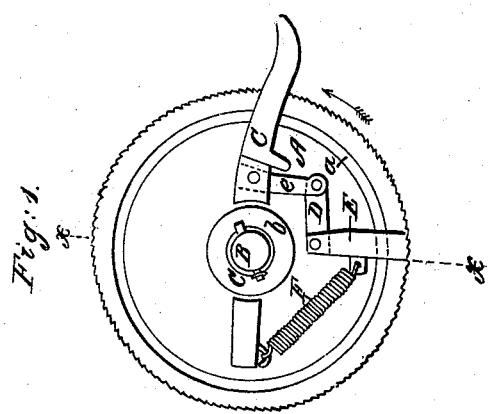
Witnesses:
J. P. Hall
F. McNamara

UNITED STATES PATENT OFFICE.

O. C. PHELPS, OF NEW YORK, N. Y.

IMPROVEMENT IN FEED-WHEELS OF SEWING-MACHINES.

Specification forming part of Letters Patent No. 43,705, dated August 2, 1864.

*To all whom it may concern:*

Be it known that I, O. C. PHELPS, of the city, county, and State of New York, have invented a new and Improved Feed-Wheel for Sewing-Machines; and I do hereby declare that the following is a full, clear, and exact description thereof, which will enable others skilled in the art to make and use the same, reference being had to the accompanying drawings, making a part of this specification, in which—

Figure 1 is a side view of my invention; Fig. 2, a section of the same, taken in the line $x\,x$, Fig. 1.

Similar letters of reference indicate like parts.

This invention consists in providing the feed-wheel with a concentric annular flange projecting from it at one side near its periphery, and having a driver or clutch fitted upon it and connected by a link with the operating-lever, which has the axis of the wheel for its fulcrum, all being arranged in such a manner that the feed-wheel will be operated with certainty and precision, without the liability of the clutch or driver sticking or slipping, either on account of wear or other causes, and the feed-wheel at the same time rendered capable of being operated with less power than usual.

A represents the feed-wheel of a sewing-machine, and B is its axle, on which it turns freely. The feed-wheel is provided with an annular flange, $a$, which projects from it at right angles near its periphery.

C represents a lever, which is also fitted loosely on the axle B, and is provided with a hub, $b$, which is kept in contact with the feed-wheel by means of a spiral spring, $c$, (shown in Fig. 2,) said spring also keeping the wheel in contact with a shoulder, $d$, on the axle B. The lever C is provided with a pendent arm, $e$, the lower end of which is connected by a link, D, with the upper end of a clutch or driver, E, which is simply a short bar provided with a notch or recess, $f$, at one side to receive the flange $a$. The clutch or driver E, just within the flange $a$, is connected by a spiral spring, F, with the inner end of the lever C, as shown in Fig. 1.

From the above description it will be seen that as the outer end of the lever C is pressed down the clutch or driver E will slip over the annular flange $a$, and as the outer end of said lever is forced or pressed upward the clutch or driver will bind on said flange and move or turn the feed-wheel in the direction indicated by the arrow in Fig. 1, and thereby give the desired feed-movement to the wheel. It will further be seen that the wheel is turned from a point near its periphery, and by a link-connection between the lever C and the clutch or driver E, and the wheel consequently turned with but a moderate expenditure of power and with but a slight play or movement of the lever C. The clutch or driver E, in consequence of being applied to the flange $a$ and operated from the lever C, as shown, will always grasp the flange $a$ with certainty when the outer end of said lever is forced upward. The contingency of slipping and sticking cannot occur, while at the same time the clutch or driver is allowed to move freely forward on the flange $a$ when the outer end of the lever C is pressed down. The spring F keeps the clutch or driver in proper position on flange $a$ while the former is moved forward over the latter to obtain a succeeding hold on the flange.

This device is also attended with the advantage of not being affected by wear. The recess $f$ will always "bite" or grasp the flange regardless of wear.

I claim as new and desire to secure by Letters Patent—

Operating the clutch or driver from the lever through the medium of a link which is between the fulcrum of the lever and the flange, which the clutch or driver grasps or clamps in turning the feed-wheel, substantially as described.

O. C. PHELPS.

Witnesses:
J. P. HALL,
WM. F. MCNAMARA.